United States Patent
Han (10) Patent No.: US 8,914,023 B2
(45) Date of Patent: Dec. 16, 2014

(54) METHOD FOR TRANSMITTING MULTIMEDIA MESSAGE TO ROAMED MULTIMEDIA MESSAGE RECEIVER AND SYSTEM THEREOF

(75) Inventor: Sang-Woo Han, Goyang-si (KR)

(73) Assignee: KT Corporation, Seongnam (KR)

(*) Notice: Subject to any disclaimer, the term of this patent is extended or adjusted under 35 U.S.C. 154(b) by 822 days.

(21) Appl. No.: 12/447,367

(22) PCT Filed: Sep. 6, 2007

(86) PCT No.: PCT/KR2007/004319
§ 371 (c)(1),
(2), (4) Date: Apr. 27, 2009

(87) PCT Pub. No.: WO2008/054063
PCT Pub. Date: May 8, 2008

(65) Prior Publication Data
US 2010/0056138 A1 Mar. 4, 2010

(30) Foreign Application Priority Data
Oct. 30, 2006 (KR) .................. 10-2006-0105581

(51) Int. Cl.
*H04W 4/00* (2009.01)
*H04W 4/12* (2009.01)
*H04W 8/04* (2009.01)
*H04L 12/18* (2006.01)

(52) U.S. Cl.
CPC . *H04W 4/12* (2013.01); *H04W 8/04* (2013.01); *H04L 12/189* (2013.01)
USPC ...................................... 455/432.1; 455/466

(58) Field of Classification Search
None
See application file for complete search history.

(56) References Cited

U.S. PATENT DOCUMENTS

2004/0053618 A1* 3/2004 Leppanen et al. ............ 455/445

(Continued)

FOREIGN PATENT DOCUMENTS

| EP | 1387539 A1 | 2/2004 |
| KR | 1020030028540 A | 4/2003 |

(Continued)

OTHER PUBLICATIONS

PCT International Search Report for PCT/KR2007/004319; Apr. 2007; 7 pages.
European Patent Office, "Communication with Extended European Search Report," issued in connection with European Patent Application No. 07808112.2, dated Mar. 15, 2013.

(Continued)

*Primary Examiner* — German J Viana Di Prisco
(74) *Attorney, Agent, or Firm* — Sughrue Mion, PLLC (57) ABSTRACT

The present invention relates to a system for transmitting a multimedia message to a roamed multimedia message receiver, and a method thereof. In the method, when the multimedia message is transmitted from a first mobile communication network to a multimedia message receiver that has roamed from the first mobile communication network to a second mobile communication network, location information of the multimedia message receiver is determined according to a request for transmission of the multimedia message. A roaming state of the multimedia message is determined based on the location information of the multimedia message receiver When it is determined that the multimedia message receiver has roamed, a notification message of a pull method is transmitted to the multimedia message receiver to determine whether the multimedia message receiver accepts receipt of the multimedia message. In addition, when a response of acceptance is received from the multimedia message receiver, the multimedia message is transmitted to the multimedia message receiver.

13 Claims, 5 Drawing Sheets

(56) References Cited

U.S. PATENT DOCUMENTS

| | | |
|---|---|---|
| 2004/0148400 A1 | 7/2004 | Mostafa |
| 2005/0136915 A1* | 6/2005 | Rooke et al. .................. 455/428 |
| 2007/0249374 A1* | 10/2007 | Hu et al. ........................ 455/466 |

FOREIGN PATENT DOCUMENTS

| | | |
|---|---|---|
| KR | 2006-0019422 A | 3/2006 |
| WO | WO 9621326 A1 | 7/1996 |
| WO | 03056867 A2 | 7/2003 |
| WO | WO 03/096628 A1 | 11/2003 |

OTHER PUBLICATIONS

"Digital cellular telecommunications system (phase 2+); Universal Mobile Telecommunications System (UMTS); Multimedia Messaging Service (MMS); Functional description; Stage 2 (3GPP TS 23.140 version 6.14.0 Release 6; ETSI TS 123 140", IEEE, LIS, Sophia Antipolis CEDEX, France, vol. 3-T2, No. V6.14.0, Sep. 1, 2006.

MOSTAFA M-E: "MMS—the mordern wireless solution for multimedia messaging", Personal Indoor and Mobile Radio Communications, 2002. The 13th IEEE International Sysposium on Sep. 15-18, 2002, Piscataway, NJ, USA, IEEE, vol. 5, Sep. 15, 2002, pp. 2466-2472.

* cited by examiner

METHOD FOR TRANSMITTING MULTIMEDIA MESSAGE TO ROAMED MULTIMEDIA MESSAGE RECEIVER AND SYSTEM THEREOF

TECHNICAL FIELD

The present invention relates to a system for transmitting a multimedia message to a multimedia message user that uses a roaming service, and a method thereof. More particularly, the present invention relates to a system for transmitting a multimedia message service (MMS) to a mobile communication service subscriber using a roaming service, and a method thereof.

BACKGROUND ART

Since electrical and communication techniques are increasingly being developed, various wireless communication services using a wireless communication network are provided.

Recently, a wireless Internet service has been suggested. The wireless Internet service is one of communication services that are similar to a service provided in the Internet through a wireless communication network while a user of a mobile terminal moves without a location limitation. Accordingly, mobile communication service subscribers may communicate with another person anytime and anyplace by using the wireless communication service while moving, and they may receive text messages, voice messages, images, or motion pictures that include information on news, weather forecast, sports, stocks, foreign exchange rates, and traffic through the wireless Internet service.

A message service in which information is received as a multimedia type of text messages, voice messages, images, or motion pictures as described is referred to as a multimedia message service.

In addition, a roaming service provides a mobile communication service to a mobile communication service subscriber who visits a service area of another mobile communication operator according to a mutual agreement between mobile communication operators.

Conventionally, when a mobile communication service subscriber uses the roaming service, data are routed to a home network of the mobile communication service subscriber.

Accordingly, when a multimedia message including various data is transmitted to the mobile communication service subscriber using the roaming service, a high cost of a data roaming service may be charged to the mobile communication service subscriber since they are using a data call.

In addition, a push method is conventionally used to transmit a multimedia message. Therefore, in the conventional multimedia message service, the mobile communication service subscriber using the roaming service may be dissatisfied with the service since the multimedia message is received without being acknowledged by the mobile communication service subscriber.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a multimedia message transmission method in which a message receiving selection authority is provided to a roamed multimedia message receiver, and a system thereof.

Technical Solution

According to an exemplary embodiment of the present invention, in a method for transmitting a multimedia message from a first mobile communication network to a multimedia message receiver that has roamed to a second mobile communication network from the first mobile communication network, a) a roaming state of the multimedia message receiver is determined based on location information of the multimedia message receiver when there is a request for multimedia message transmission, b) a notification message of a pull method is transmitted to determine whether the multimedia message user accepts receipt of the multimedia message when it is determined in a) that the multimedia message receiver has roamed, and c) the multimedia message requested to be transmitted to the multimedia message receiver is transmitted when a response of acceptance is received from the multimedia message receiver.

A system according to the exemplary embodiment of the present invention transmits a multimedia message from a first mobile communication network to a multimedia message receiver that has roamed from the first mobile communication network to a second mobile communication network. The system includes a home location register, a multimedia message server, and a short message server. The home location register provides location information of the multimedia message receiver. The multimedia message server requests transmission of a notification message of the pull method to determine whether the multimedia message receiver accepts receipt of the multimedia message when it is determined, based on location information of the multimedia message receiver that is received from the home location register, that the multimedia message receiver has roamed. The short message server transmits the notification message of the pull method to the roamed multimedia message receiver according to a request of the multimedia message server.

A system according to another exemplary embodiment of the present invention transmits a multimedia message from a first mobile communication network to a multimedia message receiver that has roamed from the first mobile communication network to a second mobile communication network. The system includes a home location register, a multimedia message server, and a short message server. The home location register provides location information of the multimedia message receiver. The multimedia message server requests transmission of a notification message of a pull method when requesting transmission of a notification message including a roaming indicator for determining a roaming state and receiving a reception failure message according to a roaming operation of the multimedia message receiver. The short message server transmits the reception failure message to the multimedia message server and transmits the notification message of the pull method according to a request of the multimedia message server when it is determined, based on the roaming state determined according to location information of the multimedia message receiver and the roaming indicator, that the multimedia message receiver has roamed.

Advantageous Effects

According to the exemplary embodiments of the present invention, since the notification of the pull method in which authority for selecting reception of the multimedia message is given is transmitted to the roamed multimedia message receiver, a problem in that the multimedia message is downloaded without user s intention and a data roaming cost is charged may be solved.

BEST MODE FOR CARRYING OUT THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise", and variations such as "comprises" and "comprising", will be understood to imply the inclusion of stated elements but not the exclusion of any other elements.

A method for transmitting a multimedia message to a user who roams to a service area of another mobile communication operator and a system thereof will be described with reference to the figures.

Here, "roaming" is a service in mobile communications that refers to the extending of connectivity service in a network that is different than the network to which a subscriber is subscribed.

Through the specification, networks within service coverage areas provided by different mobile communication operators will be respectively referred to as first and second mobile communication networks.

For example, the first and second mobile communication networks may be respectively a mobile communication network of a first country and a mobile communication network of a second country.

A configuration for transmitting a multimedia message to a receiver who roams to a service area of another mobile communication operator according to an exemplary embodiment of the present invention will now be described with reference to the figures.

Figure 1:
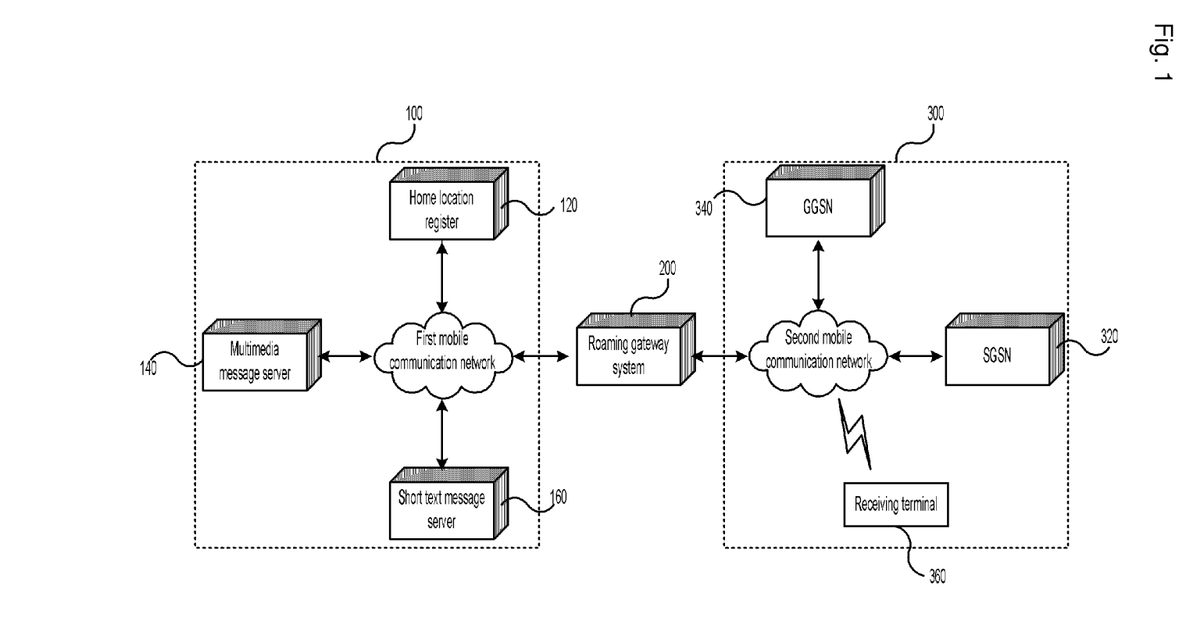
FIG. 1 shows a schematic diagram of a configuration of a network for transmitting a multimedia message according to an exemplary embodiment of the present invention.

FIG. 1 shows a schematic diagram of a configuration of a network for transmitting a multimedia message according to an exemplary embodiment of the present invention.

As shown in FIG. 1, the network for transmitting the multimedia message includes a first mobile communication system 100, a roaming gateway system 200, and a second mobile communication system 300.

The first mobile communication system 100 and the second mobile communication system 300 are respectively operated by different mobile communication operators.

The roaming gateway system 200 is connected between the first mobile communication system 100 and the second mobile communication system 300, and converts signals to exchange signals between the first mobile communication system 100 and the second mobile communication system 300.

In addition, for the first mobile communication system 100, the roaming gateway system 200 functions as a visitor location register (VLR) so that the second mobile communication system 300 gives the roaming gateway system 200 a location of a receiving terminal 360.

Further, for the second mobile communication system 300, the roaming gateway system 200 functions as a home location register (HLR) to manage a subscriber profile of the receiving terminal 360.

The first mobile communication system 100 includes a home location register 120, a multimedia message server 140, and a short text message server 160.

The home location register 120 stores subscriber information and location information that are registered in the first mobile communication system 100.

The multimedia message server 140 transmits a multimedia message including various multimedia data of motion pictures and voices.

In addition, the multimedia message server 140 transmits a notification message for confirming whether the receiving terminal 360 accepts receipt of the multimedia message, and transmits the multimedia message when receiving a response of acceptance of the receipt of the multimedia message.

The short text message server 160 indicates a paging agent for transmitting a paging message to a terminal. For example, the short text message server 160 may be a short messaging service center.

The short text message server 160 transmits the notification message to the receiving terminal 360 and receives a response to the notification message according to a request from the multimedia message server 140.

The second mobile communication system 300 is a mobile communication system to which the receiving terminal 360 roams, and only a packet data network is illustrated in FIG. 1.

The second mobile communication system 300 includes a serving general packet radio service (GPRS) support node (SGSN) 320 and a gateway GPRS support node (GGSN) 340.

Here, the SGSN 320 manages mobility of the receiving terminal 360, processes transmitted/received signals, manages sessions for transmitting/receiving packet data, performs authentication and account functions, and performs a routing process function of the packet data.

The GGSN 340 allocates an Internet protocol (IP) address to the receiving terminal 360 to provide a packet data service, manages sessions, performs a routing process function of the packet data, and provides an interface for accessing the Internet network.

According to the above configuration, when the multimedia message server 140 of the first mobile communication system 100 transmits a multimedia message to the receiving terminal 360, the short text message server 160 firstly transmits a notification message to the roaming gateway system 200. Then, the notification message is transmitted to the receiving terminal 360 through the SGSN 320 accessed to the second mobile communication network.

In addition, information on various multimedia messages is transmitted to the receiving terminal 360 through the GGSN 340.

The first mobile communication system 100 determines a roaming state of the receiving terminal 360 managed by the home location register 120 before transmitting the notification message. When it is determined that the receiving terminal 360 roams, the first mobile communication system 100 transmits the notification message of a pull method.

In addition, when a response of acceptance of receipt of the multimedia message is transmitted from the receiving terminal 360, the multimedia message is downloaded to the receiving terminal from the multimedia message server 140.

Accordingly, since the multimedia message is transmitted by changing a transmission method to a pull method when the receiving terminal 360 roams, a problem in that the multimedia message is received without being acknowledged by a subscriber and a data roaming cost is charged may be solved. The above configuration is different from a configuration in which the multimedia message is transmitted by the push method regardless of the roaming state.

Here, in the push method, information stored in a server is automatically transmitted to a client not by an operation of a user at a client side but by an operation of the server.

In the pull method, the information stored in the server is transmitted to the client when a request is transmitted by the operation of the user at the client side.

Configurations of a system for transmitting the multimedia message according to the roaming state of the receiving terminal 360 will now be described.

Figure 2:
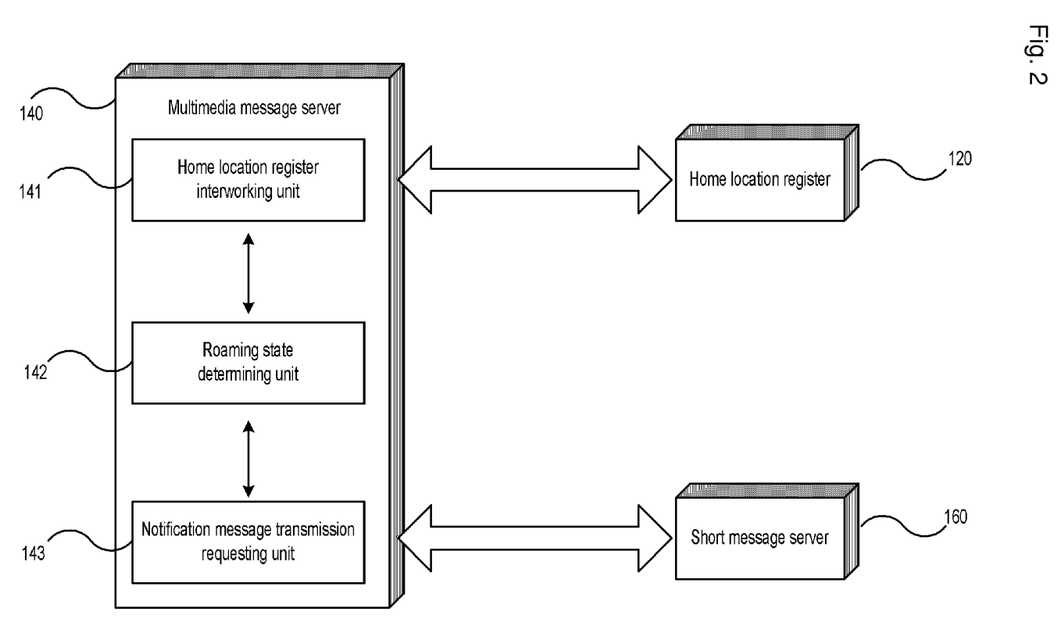
FIG. 2 is a diagram of a configuration of a multimedia message transmission system according to a first exemplary embodiment of the present invention.

FIG. 2 is a diagram of a configuration of a multimedia message transmission system according to a first exemplary embodiment of the present invention.

As shown in FIG. 2, the home location register 120 provides location information of a multimedia message receiver.

In this case, the location information of the multimedia message receiver includes a global title (GT) for determining a roaming state of the multimedia message receiver.

Here, the GT is an address used in signal connection and control part (SCCP) protocol to perform routing of a signaling message in the communication network. The GT that is an address such as a dialing number is not directly used to perform SCCP routing, but it is used to provide information for the SCCP routing by a translation function of the SCCP.

The multimedia message server 140 requests the short text message server 160 to transmit the notification message when it is determined, based on the location information of the multimedia message receiver that is received from the home location register 120, that the multimedia message receiver roams.

The short text message server 160 transmits the notification message of the pull method to the roamed multimedia message receiver according to the request of the multimedia message server 140.

The multimedia message server 140 includes a home location register interworking unit 141, a roaming state determining unit 142, and a notification message transmission requesting unit 143.

The home location register interworking unit 141 requests the location information of the multimedia message receiver from the home location register 120 and receives it.

The roaming state determining unit 142 determines the roaming state of the multimedia message receiver based on the location information of the multimedia message receiver received from the home location register interworking unit 141.

The notification message transmission requesting unit 143 requests the short message server 160 to transmit the notification message of the pull method when the roaming state determining unit 142 determines that the multimedia message receiver roams.

Figure 3:
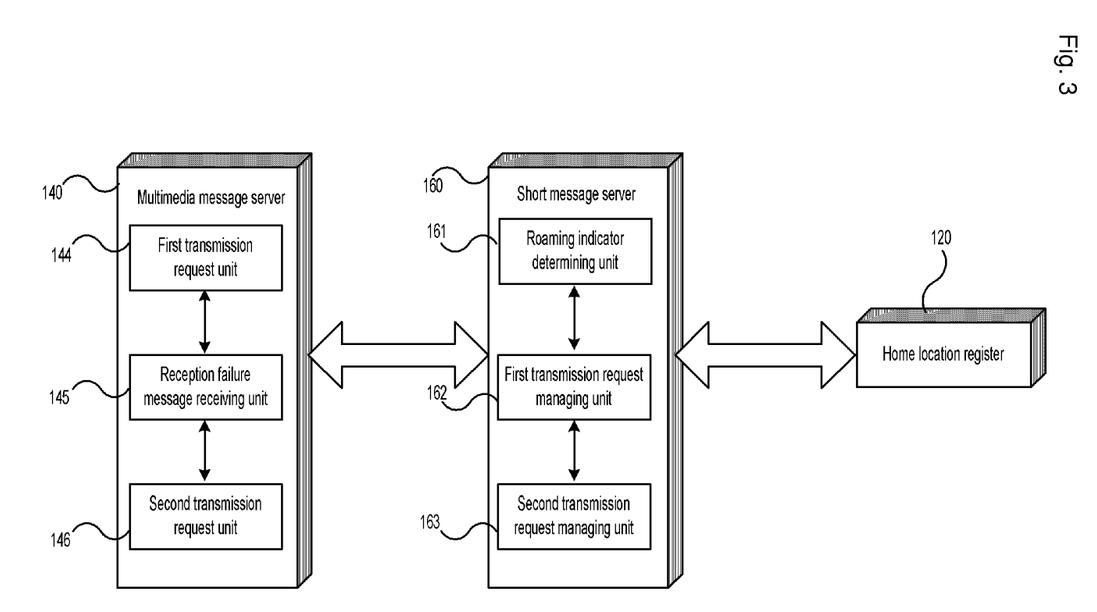
FIG. 3 is a diagram of a configuration of the multimedia message transmission system according to a second exemplary embodiment of the present invention.

FIG. 3 is a diagram of a configuration of the multimedia message transmission system according to a second exemplary embodiment of the present invention.

As shown in FIG. 3, the home location register 120 provides the location information of the multimedia message receiver in a like manner of the home location register 120 shown in FIG. 2.

The multimedia message server 140 requests the short text message server 160 to transmit the notification message including a roaming identifier for determining the roaming state. In addition, when a reception failure message according to a roaming operation of the multimedia message receiver is received from the short text message server 160, the multimedia message server 140 requests the short text message server 160 to transmit the notification of the pull method.

The short text message server 160 determines the roaming state of the multimedia message receiver based on the location information of the multimedia receiver that is determined by using the roaming indicator. When it is determined that the multimedia message receiver has roamed, the reception failure message is transmitted to the multimedia message server 140. In addition, the notification message of the pull method is transmitted according to the request of the multimedia message server 140.

Configurations of the multimedia message server 140 and the short text message server 160 will now be described.

The multimedia message server 140 includes a first transmission request unit 144, a reception failure message receiving unit 145, and a second transmission request unit 146.

The first transmission request unit 144 requests the short text message server 160 to transmit the push method notification message in which the roaming indicator is set.

The reception failure message receiving unit 145 receives a reception failure message for informing reception failure caused by the roaming operation of the multimedia message receiver with respect to the push method notification message transmission request that is requested by the first transmission request unit 144.

When the reception failure message receiving unit 145 receives the reception failure message, the second transmission request unit 146 requests the short text message server 160 to transmit the pull method notification message in which the roaming indicator is unset.

The short text message server 160 includes a roaming indicator determining unit 161, a first transmission request managing unit 162, and a second transmission request managing unit 163.

The roaming indicator determining unit 161 determines set/unset states of the roaming indicator included in the notification message requested by the multimedia message server 140.

The first transmission request managing unit 162 requests the home location register 120 to determine the roaming state based on the received location information of the multimedia message receiver when the roaming indicator is set. When it is determined that the multimedia message receiver roams, the reception failure message is transmitted to the multimedia message server 140.

The second transmission request managing unit 163 requests the home location register 120 to transmit the notification message of the pull method based on the received location information of the multimedia message user when the roaming indicator is unset.

The short text message server 160 described in FIG. 2 and FIG. 3 may add a text message to the notification message of the pull method, the text message informing a data roaming cost charged when receiving the multimedia message.

A method for transmitting the multimedia message according to the above configuration will now be described.

Figure 4:
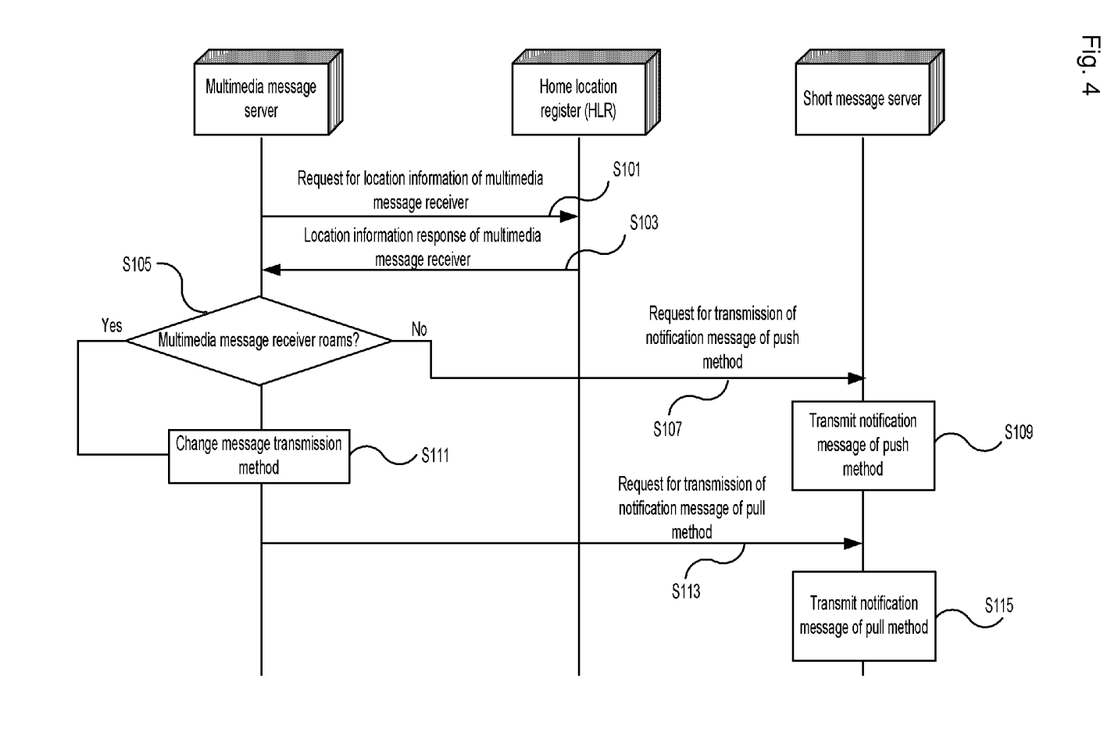
FIG. 4 is a diagram representing a method of transmitting the multimedia message according to the first exemplary embodiment of the present invention.

FIG. 4 is a diagram representing a method of transmitting the multimedia message according to the first exemplary embodiment of the present invention.

As shown in FIG. 4, the multimedia message server 140 requests the home location register 120 to transmit the location information of the multimedia message receiver and receives it in steps S101 and S103.

The multimedia message server 140 determines a roaming state of the multimedia message in step S105 based on the location information of the multimedia message receiver that is received in step S103.

When it is determined in step S105 that the multimedia message receiver does not roam, the multimedia message server 140 requests the short text message server 160 to transmit the notification message of the push method in step S107.

The short text message server 160 transmits the notification message of the push method requested in step S107 to the receiving terminal 360 in step S109.

In addition, when it is determined in step S105 when the multimedia message receiver roams, the multimedia message server 140 changes a transmission method from the push method to the pull method in step S111.

The multimedia message server 140 requests the short text message server 160 in step S113 to transmit the notification of the pull method that is changed in step S111.

The short text message server 160 transmits the notification message of the pull method requested in step S113 to the receiving terminal 360 in step S115.

Figure 5:
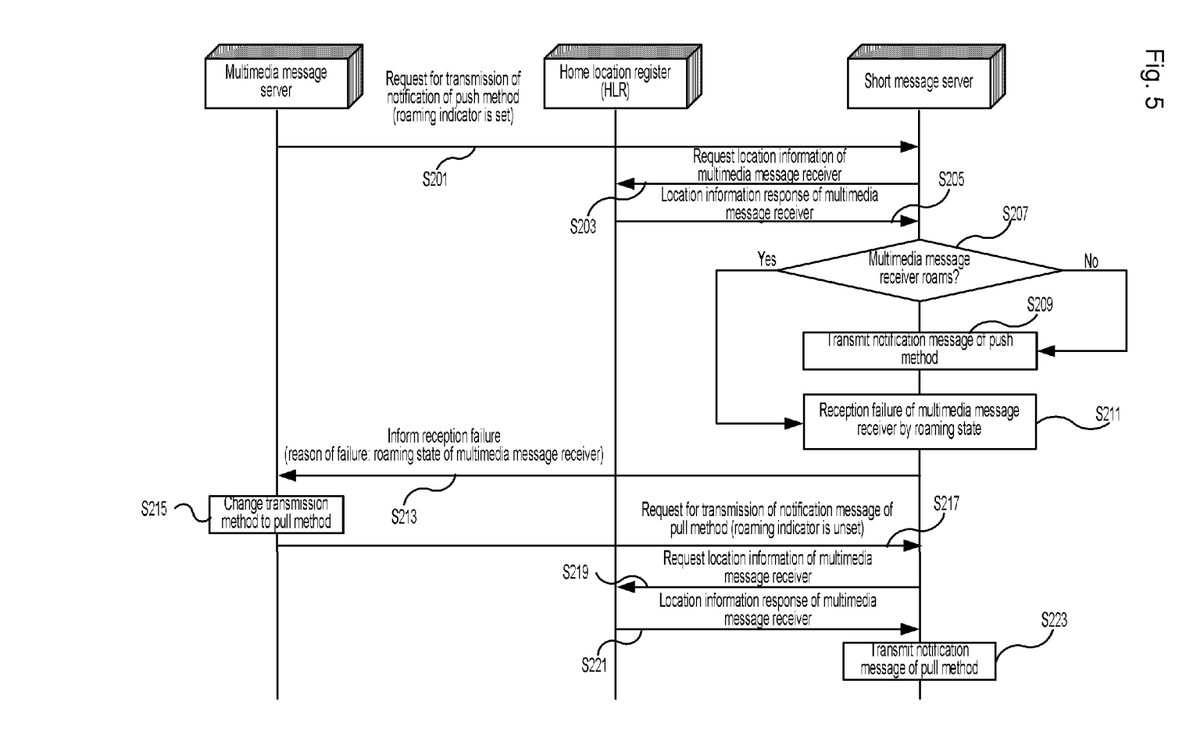
FIG. 5 is a diagram representing a method for transmitting the multimedia message according to the second exemplary embodiment of the present invention.

FIG. 5 is a diagram representing a method for transmitting the multimedia message according to the second exemplary embodiment of the present invention.

As shown in FIG. 5, the multimedia message server 140 sets the roaming indicator to the short text message server 160 to request transmitting the notification message of the push method in step S201.

The short text message server 160 requests the home location register 120 to transmit the location information of the multimedia message receiver in step S203 and receives it in step S205.

The short text message server 160 determines the roaming state of the multimedia message receiver in step S207 based on the location information of the multimedia message received from the home location register 120.

When it is determined in step S207 that the multimedia message receiver does not roam, the notification message of the push method is transmitted to the receiving terminal 360 in step S209.

In addition, when it is determined in step S207 that the multimedia message receiver has roamed, it is considered in step S211 that the notification message transmission of the push method request in step S201 fails by the roaming operation of the multimedia message receiver. In addition, the reception failure message for informing the reception failure caused by the roaming operation of the multimedia message receiver is transmitted to the multimedia message server 140 in step S213.

The multimedia message server 140 receiving the reception failure message in step S213 changes the transmission method to the pull method in step S215.

The multimedia message server 140 unsets the roaming indicator and requests the short text message server 160 to transmit the notification message of the pull method in step S217.

The short text message server 160 uses the location information of the multimedia message receiver received by requesting the home location register 120 in step S221 and transmits the notification message of the pull method to the receiving terminal 360 in step S223.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for transmitting a multimedia message from a first mobile communication network to a multimedia message receiver that has roamed to a second mobile communication network from the first mobile communication network, the method comprising:
    a) using a multimedia message server to determine whether the multimedia message receiver has roamed based on location information of the multimedia message receiver when there is a request for multimedia message transmission, wherein the multimedia message server requests a short message server to transmit a first notification message including a roaming indicator and the short message server determines whether the multimedia message receiver has roamed based on location information of the multimedia message receiver;
    b) when it is determined that the multimedia message receiver has roamed, transmitting a second notification message of a pull method to query whether the multimedia message receiver accepts receipt of the multimedia message, wherein when a multimedia message server receives a reception failure message which indicates a failure of the transmission of the first notification message and which is caused by a roaming of the multimedia message receiver from the short message server, the multimedia message server requests the short message server to transmit the second notification message of the pull method and the short message server transmits the second notification message of the pull method; and
    c) when a response of receipt of acceptance of the multimedia message is received from the multimedia message receiver, transmitting the multimedia message to the multimedia message receiver.

2. The method of claim 1, wherein, in a):
    the multimedia message server for transmitting the multimedia message requests a home location register for managing the location information of the multimedia message receiver to transmit the location information of the multimedia message receiver and receives the location information;
    the multimedia message server determines the roaming state of the multimedia message receiver based on the location information of the multimedia message receiver that is received from the home location register; and
    the multimedia message server requests the short message server to transmit the first notification message of a short message type when it is determined that the multimedia message receiver has roamed, and requests the short message server, which receives a response to the first notification message, to transmit the second notification message of the pull method.

3. The method of claim 2, wherein in a), a global title (GT) of the multimedia message receiver that is received from the home location register is used to determine the roaming state of the multimedia message receiver.

4. The method of claim 1, wherein in b), when the reception failure message with respect to the request for transmitting the first notification message including the roaming indicator is received according to the roaming state determined based on the location information of the multimedia message receiver in a), the short message server unsets the roaming indicator and requests transmission of the second notification message of the pull method.

5. The method of claim 1, wherein in b), the second notification message of the pull method includes a text message including information relating to a data roaming cost when receiving the multimedia message is transmitted.

6. A system for transmitting a multimedia message from a first mobile communication network to a multimedia message receiver that has roamed from the first mobile communication network to a second mobile communication network, the system comprising:
    a home location register for providing location information of the multimedia message receiver;
    a multimedia message server for requesting transmission of a notification message of a pull method to query to the multimedia message receiver whether the multimedia message receiver accepts receipt of the multimedia message, and when a response of acceptance of the multimedia message is received from the multimedia message receiver, transmitting the multimedia message to the multimedia message receiver; and
    a short message server for transmitting the notification message of the pull method to the roamed multimedia message receiver according to a request of the multimedia message server and receiving the response of receipt acceptance of the multimedia message from the multimedia message receiver,
    wherein when the multimedia message server receives a reception failure message which indicates a failure of the transmission of the notification message and which is caused by a roaming of the multimedia message receiver from the short message server, the multimedia message server requests the short message server to transmit the notification message of the pull method to the roamed multimedia message receiver.

7. The system of claim 6, wherein the multimedia message server comprises:
    a home location register interworking unit for requesting the home location register to transmit the location information of the multimedia message receiver and receiving the location information;
    a roaming state determining unit for determining a roaming state of the multimedia message receiver based on the location information of the multimedia message receiver that is received through the home location register interworking unit; and
    a notification message transmission requesting unit for requesting the short message server to transmit the notification message of the pull method when the roaming state determining unit determines that the multimedia message receiver has roamed.

8. The system of claim 6, wherein the home location register provides the location information of the multimedia message receiver that includes a global title (GT) for determining the roaming state of the multimedia message receiver.

9. The system of claim 6, wherein the short message server transmits the notification message of the pull method that includes a text message including information relating to a data roaming cost when the multimedia message is received.

10. A system for transmitting a multimedia message from a first mobile communication network to a multimedia message receiver that has roamed from the first mobile communication network to a second mobile communication network, the system comprising:
    a home location register for providing location information of the multimedia message receiver;
    a multimedia message server for requesting transmission of a first notification message including a roaming indicator and when receiving a reception failure message which indicates a failure of the transmission of the first notification message and which is caused by a roaming of the multimedia message receiver, requesting transmission of a second notification message of a pull method to query to the multimedia message receiver whether the multimedia message receiver accepts receipt of the multimedia message, and when a response of receipt of acceptance of the multimedia message is received from the multimedia message receiver, transmitting the multimedia message to the multimedia message receiver; and
    a short message server for transmitting the reception failure message to the multimedia message server and transmitting the second notification message of the pull method to the roamed multimedia message receiver according to a request of the multimedia message server and receiving the response of receipt of acceptance of the multimedia message from the multimedia message receiver.

11. The system of claim 10, wherein the short message server comprises:
    a roaming indicator determining unit for determining whether the roaming indicator is set or unset;
    a first transmission request managing unit for determining the roaming state of the multimedia message receiver based on the location information of the multimedia message receiver when the roaming indicator is set, and transmitting the reception failure message to the multimedia message server when the multimedia message receiver has roamed; and
    a second transmission request managing unit for transmitting the second notification message of the pull method to the multimedia message receiver based on the location information of the multimedia message receiver when the roaming indicator is unset.

12. The system of claim 10, wherein the short message server transmits the second notification message of the pull method that includes a text message including information relating to a data roaming cost when the multimedia message is received.

13. The system of claim 10, wherein the multimedia message server comprises:
    a first transmission request unit for requesting the short message server to transmit a notification message of a push method in which the roaming indicator is set;
    a reception failure message receiving unit for receiving the reception failure message from the short message server with respect to a request for transmission of the notification message of the push method, the reception failure message informing reception failure caused by a roaming operation of the multimedia message receiver; and
    a second transmission request unit for requesting the short message server to transmit the notification message of the pull method in which the roaming indicator is unset when the reception failure message is received.

* * * * *